United States Patent
Fan et al.

(10) Patent No.: US 12,468,611 B2
(45) Date of Patent: Nov. 11, 2025

(54) UNIFIED FAULT AND STABILITY ANALYSIS SYSTEM AND METHOD CONSIDERING UNBALANCED TOPOLOGIES

(71) Applicant: University of South Florida, Tampa, FL (US)

(72) Inventors: Lingling Fan, Tampa, FL (US); Zhixin Miao, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 18/654,042

(22) Filed: May 3, 2024

(65) Prior Publication Data

US 2024/0370342 A1   Nov. 7, 2024

Related U.S. Application Data

(60) Provisional application No. 63/500,328, filed on May 5, 2023.

(51) Int. Cl.
 *G06F 11/00* (2006.01)
 *G06F 11/22* (2006.01)

(52) U.S. Cl.
 CPC .............. *G06F 11/2273* (2013.01)

(58) Field of Classification Search
 CPC ................................ G06F 11/2273
 USPC ...................................... 714/1–57
 See application file for complete search history.

(56) References Cited

U.S. PATENT DOCUMENTS

| | | | |
|---|---|---|---|
| 6,502,046 B1* | 12/2002 | Yoon | G01R 31/2839 324/76.23 |
| 11,303,579 B1 | 4/2022 | Fan et al. | |
| 2016/0077160 A1* | 3/2016 | Wampler, II | G01R 31/367 702/63 |
| 2022/0090578 A1 | 3/2022 | Larsen et al. | |
| 2022/0163592 A1* | 5/2022 | Barsukov | G01R 31/3842 |
| 2022/0190602 A1 | 6/2022 | Shine et al. | |

FOREIGN PATENT DOCUMENTS

CN  106021768  1/2019

OTHER PUBLICATIONS

D. Piper. (2021) Forced Oscillations in Renewable Generation MVAR. [Online]. Available: https://www.nerc.com/comm/RSTC/IRPWG/IRPWG Jan. 20, 2021 Meeting Presentations.pdf.

(Continued)

*Primary Examiner* — Sarai E Butler
(74) *Attorney, Agent, or Firm* — Meunier Carlin & Curfman LLC

(57) ABSTRACT

For systems subject to unbalanced faults, analytical model building for stability assessment is a challenging task. This application presents a straightforward modeling approach. A generalized dynamic circuit representation is achieved by use of the Laplace transform variables. The voltage and current relationship at the fault location is translated into the relationship of three subsystems. The final circuit model is an interconnected sequence network with impedances in the Laplace domain. This circuit can be directly converted from a steady-state sequence network.

20 Claims, 7 Drawing Sheets

(56) References Cited

OTHER PUBLICATIONS

G. Kobet. (2021) IBR Oscillations in TVA. [Online]. Available: https://www.nerc.com/comm/RSTC/IRPWG/IRPWG Meeting Presentations—Aug. 19, 2021.pdf.

H. Mahmood, D. Michaelson, and J. Jiang, "A power management strategy for pv/battery hybrid systems in islanded microgrids," IEEE Journal of Emerging and Selected Topics in Power Electronics, vol. 2, No. 4, pp. 870-882, 2014.

M. Nuhic and G. Yang, "A hybrid system consisting of synchronous condenser and battery-enhanced services for weak systems," in 2019 IEEE PES Innovative Smart Grid Technologies Europe (ISGT—Europe). IEEE, 2019, pp. 1-5.

Y. Zhou, Y. Zhan, Q. Yu, D. Guru, and P. Zhao, "Electrical pre-design for grid code compliant evaluation of wind power plant in vestas," in 2011 Asia-Pacific Power and Energy Engineering Conference. IEEE, 2011, pp. 1-7.

J. Van de Vyver, J. D. De Kooning, B. Meersman, L. Vandevelde, and T. L. Vandoorn, "Droop control as an alternative inertial response strategy for the synthetic inertia on wind turbines," IEEE Transactions on Power Systems, vol. 31, No. 2, pp. 1129-1138, 2015.

J. Martinez, P. C. Kjær, P. Rodriguez, and R. Teodorescu, "Design and analysis of a slope voltage control for a dfig wind power plant," IEEE Transactions on Energy Conversion, vol. 27, No. 1, pp. 11-20, 2012.

Y. Zhou, D. D. Nguyen, P. C. Kjær, and S. Saylors, "Connecting wind power plant with weak grid—challenges and solutions," in 2013 IEEE Power & Energy Society General Meeting, 2013, pp. 1-7.

J. Martinez, P. C. Kjær, P. Rodriguez, and R. Teodorescu, "Comparison of two voltage control strategies for a wind power plant," in 2011 IEEE/PES Power Systems Conference and Exposition, 2011, pp. 1-9.

J. Kim, J.-K. Seok, E. Muljadi, and Y. C. Kang, "Adaptive q-v scheme for the voltage control of a DFIG-based wind power plant," IEEE Transactions on Power Electronics, vol. 31, No. 5, pp. 3586-3599, 2016.

NERC. (Mar. 2021) Reliability Guideline: Performance, Modeling, and Simulations of BPS connected Battery Energy Storage Systems and Hybrid Power Plants. https://www.nerc.com/comm/RSTC_Reliability_Guidelines/Reliability_Guideline_BESS_Hybrid_Performance_Modeling_Studies.pdf.

L. Fan, Z. Miao, D. Piper, D. Ramasubramanian, L. Zhu, and P. Mitra, "Analysis of 0.1-hz var oscillations in solar photovoltaic power plants," IEEE Transactions on Sustainable Energy, 2022.

L. Bao, L. Fan, Z. Miao, and Z. Wang, "Hardware demonstration of weak grid oscillations in grid-following converters," in 2021 North American Power Symposium (NAPS), 2021, pp. 01-06.

L. Fan, Z. Miao, S. Shah, p. Koralewicz, V. Gevorgian, and J. Fu, "Data-driven dynamic modeling in power systems: A fresh look on inverter-based resource modeling," IEEE Power and Energy Magazine, vol. 20, No. 3, pp. 64-76, 2022.

L. Fan, Z. Miao, P. Koralewicz, S. Shah, and V. Gevorgian, "Identifying DQ-domain admittance models of a 2.3-MVA commercial grid following inverter via frequency-domain and time-domain data," IEEE Transactions on Energy Conversion, vol. 36, No. 3, pp. 2463-2472, 2021.

S. Shah, P. Koralewicz, V. Gevorgian, and R. Wallen, "Sequence impedance measurement of utility-scale wind turbines and inverters—reference frame, frequency coupling, and MIMO/SISO forms," IEEE Transactions on Energy Conversion, vol. 37, No. 1, pp. 75-86, 2022.

X. Jiang and A. Gole, A frequency scanning method for the identification of harmonic instabilities in hvdc systems, IEEE Transactions on Power Delivery, vol. 10, No. 4, pp. 1875-1881, 1995.

Johansson, Nicklas, Lennart Ängquist, and Hans-Peter Nee. "A comparison of different frequency scanning methods for study of subsynchronous resonance." IEEE Transactions on Power Systems 26.1 (2010): 356-363.

Shah, Shahil, et al. "Impedance methods for analyzing stability impacts of inverter-based resources: Stability analysis tools for modern power systems." IEEE Electrification Magazine 9.1 (2021): 53-65.

A.-A. Edris, "Subsynchronous resonance countermeasure using phase imbalance," IEEE Transactions on Power Systems, vol. 8, No. 4, pp. 1438-1447, 1993.

M. C. Chudasama and A. M. Kulkarni, "Dynamic phasor analysis of SSR mitigation schemes based on passive phase imbalance," IEEE Transactions on Power Systems, vol. 26, No. 3, pp. 1668-1676, 2011.

L. Fan and Z. Miao, "Nyquist-stability-criterion-based SSR explanation for type-3 wind generators," IEEE trans. Energy Conversion, vol. 27, No. 3, pp. 807-809, 2012.

Z. Miao, "Impedance-model-based SSR analysis for type 3 wind generator and series-compensated network," IEEE trans. Energy Conversion, vol. 27, No. 4, pp. 984-991, 2012.

H. L. Garbarino and E. T. Gross, "The goerges phenomenon-induction motors with unbalanced rotor impedances," Transactions of the American Institute of Electrical Engineers, vol. 69, No. 2, pp. 1569-1575, 1950.

R. Kar, Z. Miao, and L. Fan, "Circuit analysis of goerges phenomenon in a three-phase induction machine," in IEEE Power & Energy Society General Meeting (PESGM), 2022, pp. 1-5.

L. Harnefors, "Modeling of three-phase dynamic systems using complex transfer functions and transfer matrices," IEEE Transactions on Industrial Electronics, vol. 54, No. 4, pp. 2239-2248, 2007.

A. Rygg, M. Molinas, C. Zhang, and X. Cai, "A modified sequence domain impedance definition and its equivalence to the domain impedance definition for the stability analysis of ac power electronic systems," IEEE Journal of Emerging and Selected Topics in Power Electronics, vol. 4, No. 4, pp. 1383-1396, 2016.

X. Wang, L. Harnefors, and F. Blaabjerg, "Unified impedance model of grid-connected voltage-source converters," IEEE Transactions on Power Electronics, vol. 33, No. 2, pp. 1775-1787, 2017.

\* cited by examiner

100

300

UNIFIED FAULT AND STABILITY ANALYSIS SYSTEM AND METHOD CONSIDERING UNBALANCED TOPOLOGIES

CROSS-REFERENCE TO RELATED APPLICATIONS

This application claims benefit of, and priority to, U.S. Provisional Patent Application No. 63/500,328 filed on May 5, 2023. The contents of which is hereby incorporated by reference in its entirety.

STATEMENT OF GOVERNMENT SUPPORT

This invention was made with government support under Grant No. DE-EE 0008771, awarded by the Department of Energy. The government has certain rights in the invention.

BACKGROUND

Stability analysis considering a system with unbalanced topology is a challenging task. For a balanced system, a three-phase voltage can be converted to two constant voltage sources in the dq frame at steady state. While for an unbalanced system, multiple coordinates are necessary to model the positive, negative, and zero-sequence components as state space variables which are constant at steady state. Dynamic phasor-based modeling, has been adopted by Stankovic to study asymmetry faults, for which tremendous efforts are required to deal with calculus and frame conversion.

SUMMARY

For systems subject to unbalanced faults, analytical model building for stability assessment is a challenging task. This application presents a straightforward modeling approach. A generalized dynamic circuit representation is achieved by use of the Laplace transform variable s. The voltage and current relationship at the fault location are translated into the relationship of three subsystems. The final circuit model is an interconnected sequence network with impedances in the Laplace domain. This circuit can be directly converted from a steady-state sequence network. This modeling procedure is illustrated by an example case of an induction motor served by a grid through a series compensated line. Electromagnetic transient simulation results demonstrate that subsynchronous oscillations can be mitigated when a single-line to ground (SLG) fault is applied at the motor terminal. Stability analysis results based on the dynamic circuit corroborate the simulation results. What's more, the derived circuit effortlessly reveals why unbalance can enhance stability.

In some aspects, the techniques described herein relate to a method including: deriving a first circuit diagram representing a steady state sequence network by a computing device; receiving an indication of an unbalanced condition in the steady state sequence network by the computing device; in response to the indication of the unbalanced condiction, converting the first circuit diagram to a second circuit diagram including impedances in the Laplace domain by the computing device; performing a system analysis of the of the second circuit diagram using the unbalanced condition to determine if the unbalanced condition may result in a loss of stability for a power grid by the computing device; and in response to determining that the unbalanced condition may result in a loss of stability, generating an alert that the unbalanced condition may result in the loss of stability by the computing device.

In some aspects, the techniques described herein relate to a method, wherein the unbalanced condition is caused by a fault in the power grid.

In some aspects, the techniques described herein relate to a method, wherein the fault is a balanced or unbalanced fault.

In some aspects, the techniques described herein relate to a method, wherein the steady state sequence network represents the power grid.

In some aspects, the techniques described herein relate to a method, wherein the power grid includes generators and a transmission network.

In some aspects, the techniques described herein relate to a method, wherein the unbalanced condition is associated with an unbalanced fault in an otherwise balanced and symmetrical three-phase transmission system.

In some aspects, the techniques described herein relate to a method, wherein converting the first circuit diagram to the second circuit diagram includes representing the steady-state circuit diagram as a special case in the frequency domain, and expanding the representation to the entire frequency domain by identifying quantities associated with a nominal frequency and replacing a variable with a Laplace transform variable s, where is the nominal frequency or the synchronous frequency of the first circuit diagram.

In some aspects, the techniques described herein relate to a system including: one or more processors; and a computer-readable medium with computer-executable instructions that when executed by the one or more processors cause the one or more process to: derive a first circuit diagram representing a steady state sequence network; receive an indication of an unbalanced condition in the steady state sequence network; in response to the indication of the unbalanced condiction, convert the first circuit diagram to a second circuit diagram including impedances in the Laplace domain; perform a system analysis of the of the second circuit diagram using the unbalanced condition to determine if the unbalanced condition may result in a loss of stability for a power grid; and in response to determining that the unbalanced condition may result in a loss of stability, generate an alert that the unbalanced condition may result in the loss of stability.

In some aspects, the techniques described herein relate to a system, wherein the unbalanced condition is caused by a fault in the power grid.

In some aspects, the techniques described herein relate to a system, wherein the fault is a balanced or unbalanced fault.

In some aspects, the techniques described herein relate to a system, wherein the steady state sequence network represents the power grid.

In some aspects, the techniques described herein relate to a system, wherein the power grid includes generators and a transmission network.

In some aspects, the techniques described herein relate to a system, wherein the unbalanced condition is associated with an unbalanced fault in an otherwise balanced and symmetrical three-phase transmission system.

In some aspects, the techniques described herein relate to a system, wherein converting the first circuit diagram to the second circuit diagram includes representing the steady-state circuit diagram as a special case in the frequency domain, and expanding the representation to the entire frequency domain by identifying quantities associated with a nominal frequency and replacing a variable with a Laplace transform variable s, where is the nominal frequency or the synchronous frequency of the first circuit diagram.

In some aspects, the techniques described herein relate to a non-transitory computer-readable medium with computer-executable instructions that when executed by one or more processors cause the one or more process to: derive a first circuit diagram representing a steady state sequence network; receive an indication of an unbalanced condition in the steady state sequence network; in response to the indication of the unbalanced condiction, convert the first circuit diagram to a second circuit diagram including impedances in the Laplace domain; perform a system analysis of the of the second circuit diagram using the unbalanced condition to determine if the unbalanced condition may result in a loss of stability for the power grid; and in response to determining that the unbalanced condition may result in a loss of stability, generate an alert that the unbalanced condition may result in the loss of stability.

In some aspects, the techniques described herein relate to a non-transitory computer-readable medium, wherein the unbalanced condition is caused by a fault in the power grid.

In some aspects, the techniques described herein relate to a non-transitory computer-readable medium, wherein the fault is a balanced or unbalanced fault.

In some aspects, the techniques described herein relate to a non-transitory computer-readable medium, wherein the steady state sequence network represents the power grid.

In some aspects, the techniques described herein relate to a non-transitory computer-readable medium, wherein the power grid includes generators and a transmission network.

In some aspects, the techniques described herein relate to a non-transitory computer-readable medium, wherein the unbalanced condition is associated with an unbalanced fault in an otherwise balanced and symmetrical three-phase transmission system.

Additional advantages will be set forth in part in the description that follows, and in part will be obvious from the description, or may be learned by practice of the aspects described below. The advantages described below will be realized and attained by means of the elements and combinations particularly pointed out in the appended claims.

It is to be understood that both the foregoing general description and the following detailed description are exemplary and explanatory only and are not restrictive of the systems and methods as claimed.

BRIEF DESCRIPTION OF THE DRAWINGS

The accompanying figures, which are incorporated in and constitute a part of this specification, illustrate several aspects of the disclosure, and together with the description, serve to explain the principles of the disclosure.

DETAILED DESCRIPTION

Figure 1A:
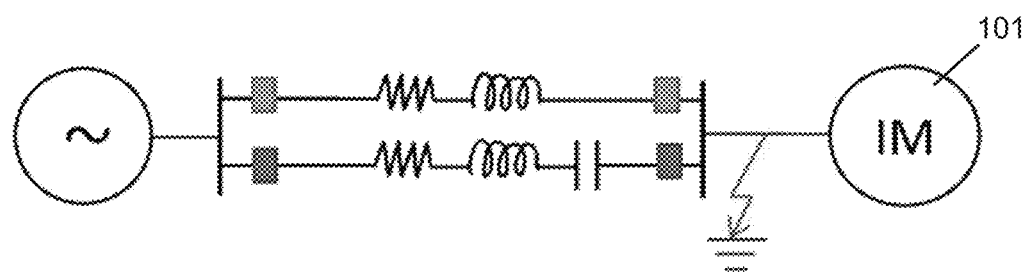
FIG. 1A is an illustration of an example circuit showing an induction motor connected to a series compensated network that is subject to an SLG fault.

FIG. 1A is an illustration of a circuit 100. The circuit 100 presents a test bed of a 200 hp 460-V induction motor (IM) 101 connected to a series compensated network. The motor speed is fixed at 0.70 pu. At t=1.5 s, the parallel RL circuit is tripped leaving the motor radially connected to the RLC circuit. This RLC circuit has 50% compensation level. At t=2.1 s, phase a is connected to the ground to emulate a SLG fault.

Figure 1B:
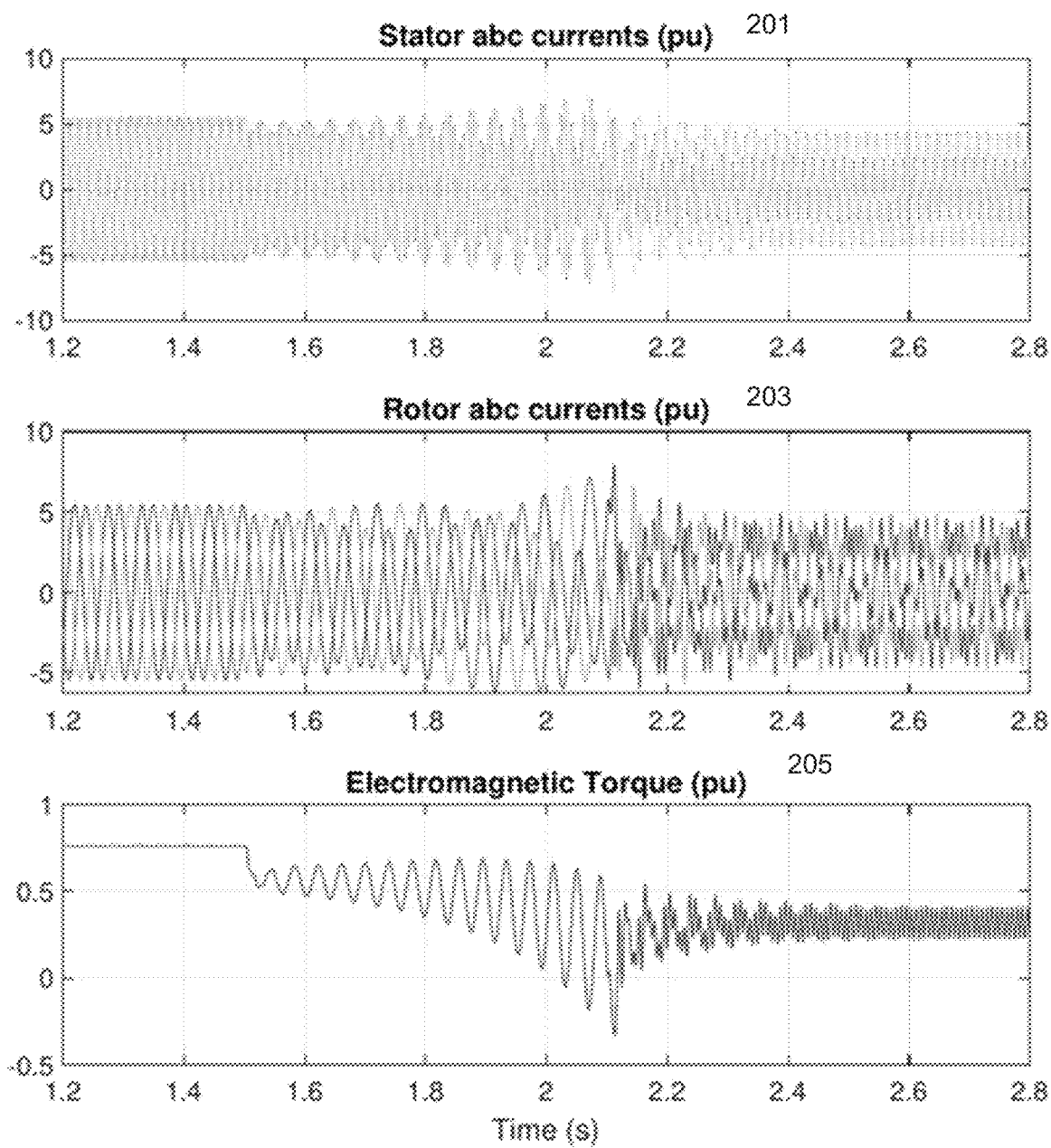
FIG. 1B is an illustration of graphs of results of simulations using the circuit of FIG. 1A.

FIG. 1B is illustrations of graphs 201, 203, and 205 showing simulation results of the circuit 100. It can be clearly seen that once the IM 101 is radially connected to the capacitor, 26-Hz oscillations in the torque and 34-Hz oscillations in the stator currents become undamped. This 26-Hz mode is due to the LC resonance. After the phase a of the terminal bus connects to the ground, the system quickly recovers stability. This example shows that the unbalanced topology helps mitigate the subsynchronous resonance (SSR).

In FIG. 1B, before t=1.5 s, the motor 101 is connected to both the RL and the RLC circuits. At t=1.5 s, the parallel RL circuit is tripped leaving the motor 101 radially connected to the RLC circuit. At t=2.1 s, phase a of the motor's terminal bus is connected to the ground. Parameters in p.u.: the RLC circuit R=0.02, $X_L$=0.2, $X_c$=0.1. IM: $R_s$=0.01282, $L_{ls}$=0.05051, $R_r$=0.00702, $L_{lr}$=0.05051, Lm=2.503.

Indeed, in the literature of SSR control, phase imbalance has been pointed out to have positive impact. In a 2011, the dynamic phasor modeling approach was adopted for model derivation and finding eigenvalues under unbalance. In was observed that large levels of phase imbalance can cause a significant movement in the subsynchronous network modal frequencies. We pose the following question. Can a more insightful explanation be offered as why imbalance can improve damping of the subsynchronous mode? This application sets to fill the gap.

For an induction machine, its dynamic circuit in s-domain has been derived. Such a circuit for type-3 wind turbines has been used for SSR analysis. The dynamic circuit of an IM extends the steady-state circuit of IM by replacing jω using s. Furthermore, the slip of the motor has been found to have the following expression:

$$\text{slip} = \frac{s - j\omega_m}{s}$$

(where $\omega_m$ is the rotor speed).

In steady-state analysis, unbalanced fault conditions can be efficiently dealt with by use of symmetric component theory and sequence network interconnection technique. For example, for an SLG fault, the three-phase fault current and the fault bus voltage have the following characteristics: $\overline{V}_a$=0, $\overline{I}_b$=$\overline{I}_c$=0. In turn, the sequence domain voltages and currents have the following relationship:

$$\overline{V}_1 + \overline{V}_2 + \overline{V}_0 = 0, \overline{I}_1 = \overline{I}_2 = \overline{I}_0 = \frac{\overline{I}_a}{3}. \tag{1}$$

Thus, the sequence networks can be interconnected in series. The fault current in sequence can be found by circuit analysis of the sequence network interconnection. Such techniques can be expanded for dynamic analysis.

In order to check the possibility, we examine the same SLG fault using time-varying space vectors, instead of phasors at the nominal frequency. The boundary conditions are expressed in time domain as follows:

$$v_a(t) = 0, \quad i_b(t) = i_c(t) = 0$$

The space vector aggregates the three-phase variables to form a single variable. In addition, we bring into the picture the conjugate of the space vector and the zero-sequence component in time domain:

$$\frac{\vec{v}(t)}{2} = \frac{1}{3}\left(v_a(t) + e^{j\frac{2\pi}{3}}v_b(t) + e^{-j\frac{2\pi}{3}}v_c(t)\right), \quad (2)$$

$$\frac{[\vec{v}(t)]^*}{2} = \frac{1}{3}\left(v_a(t) + e^{-j\frac{2\pi}{3}}v_b(t) + e^{j\frac{2\pi}{3}}v_c(t)\right), \quad (3)$$

$$v_0(t) = \frac{1}{3}(v_a(t) + v_b(t) + v_c(t)) \quad (4)$$

The above relationship leads to the expression of abc variables in terms of the space vector, its conjugate and the zerosequence component:

$$v_a(t) = v_0(t) + \frac{\vec{v}(t) + [\vec{v}(t)]^*}{2}, \quad (5)$$

$$v_b(t) = v_0(t) + \frac{e^{-j\frac{2\pi}{3}}\vec{v}(t) + e^{j\frac{2\pi}{3}}[\vec{v}(t)]^*}{2}, \quad (6)$$

$$v_c(t) = v_0(t) + \frac{e^{j\frac{2\pi}{3}}\vec{v}(t) + e^{-j\frac{2\pi}{3}}[\vec{v}(t)]^*}{2}. \quad (7)$$

Thus, the boundary condition leads to the following relationship in both time domain and frequency domain.

$$0.5\vec{v} + 0.5(\vec{v})^* + v_0 = 0, \quad (8)$$

$$0.5\vec{i} = 0.5(\vec{i})^* = i_0 = \frac{1}{3}i_a. \quad (9)$$

If the space vector $\vec{v}$ and $\vec{i}$ are viewed to be related with an impedance $Z(s)$, then their conjugates $(\vec{v})^*$ and $(\vec{i})^*$ are related with an impedance $(Z(s^*))^*$, based on the rule of Laplace transform. For an RLC circuit, both $Z(s)$ and $(Z(s^*))^*$ are the same: $R+sL+1/(sC)$. However, if there is a complex coefficient, the two impedances are not the same. For example, the induction machine's rotor equivalent resistance is expressed as $$\frac{s}{s - j\omega_m}R_r,$$

its expression for the conjugate should be $$\frac{s}{s + j\omega_m}R_r.$$

Figure 2:
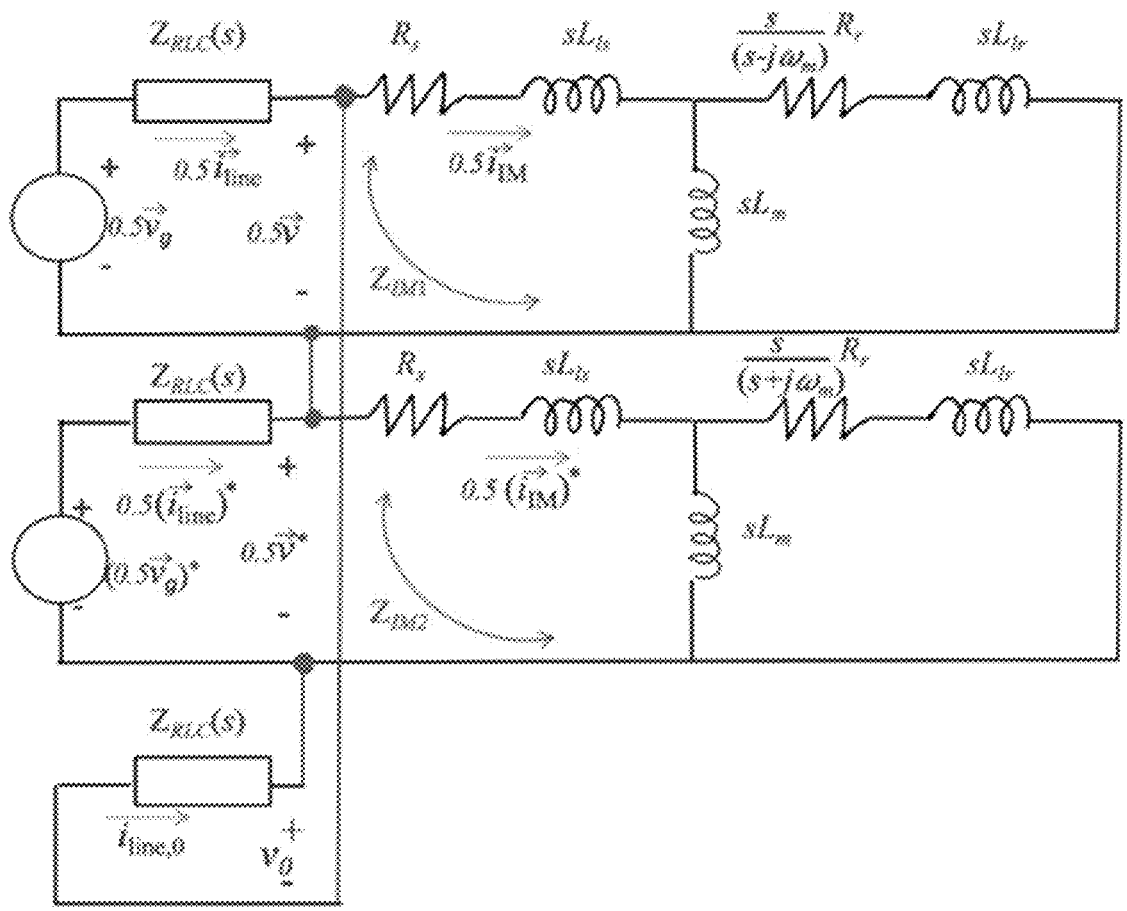
FIG. 2 is an illustration of an example circuit 200 subject to an SLG fault.

With the zero-sequence circuit available, the three circuits can be interconnected at the faulted bus to have a series connection. FIG. 2 presents the circuit 200 representing the interconnected circuit model.

Figure 3:
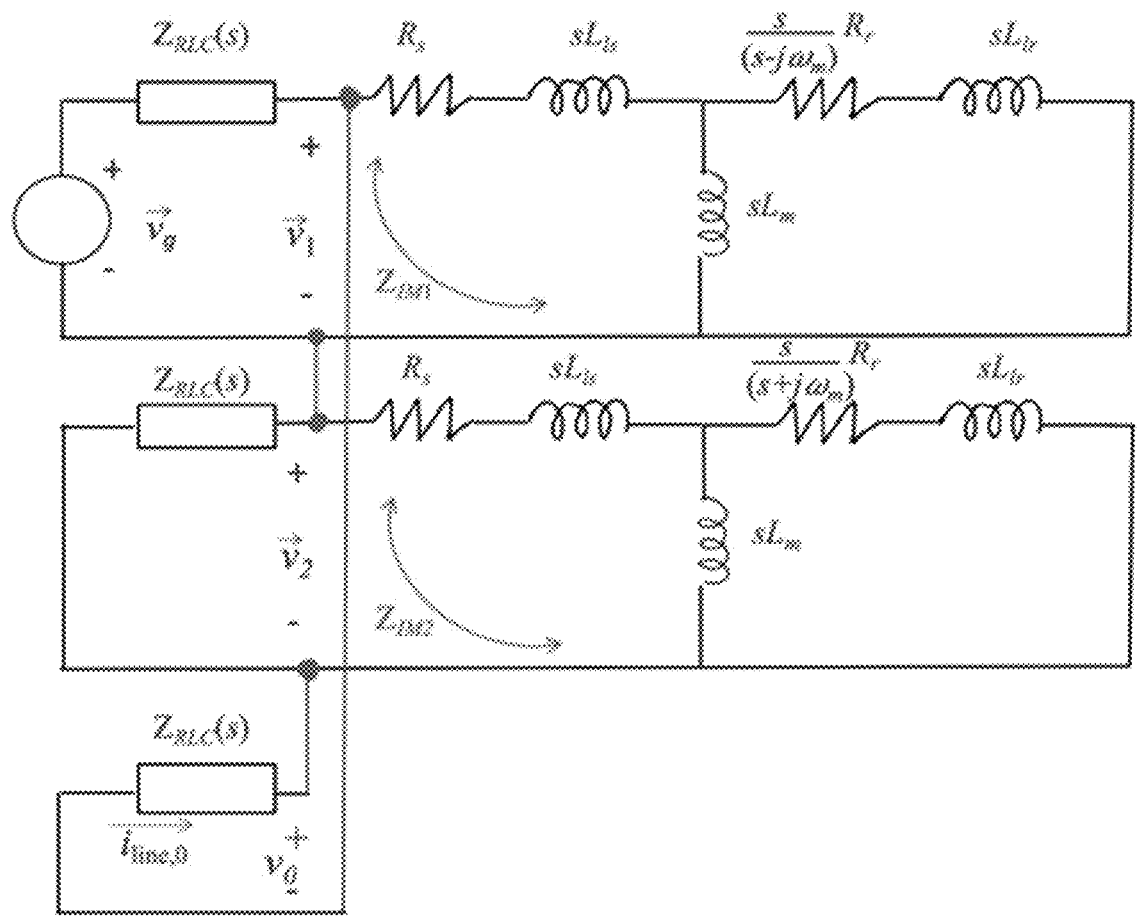
FIG. 3 is an illustration of an example circuit 300 subject to an SLG fault.

The circuit 300 in FIG. 3 is viewed based on the space vectors and the conjugates. At unbalanced conditions, the space vector has both positive and negative sequence components. To be able to associate with the steady-state interconnected sequence network, we further derive the circuit for sequence components. The boundary conditions are re-examined. A space vector can be expressed as the sum of the positive- and negative-sequence components:

$$\vec{v}(t) = \vec{v}_1(t) + [\vec{v}_2(t)]^* = \vec{V}_1(t)e^{j\omega t} + [\vec{V}_2(t)e^{j\omega t}]^* \quad (10)$$

where the subscript 1 and 2 notate positive and negative sequences, respectively. Hence the first boundary condition $0.5\vec{v} + 0.5(\vec{v})^* + v_0 = 0$ is equivalent to:

$$0.5(\vec{v}_1(t) + [\vec{v}_2(t)]^*) + 0.5([\vec{v}_1(t)]^* + \vec{v}_2(t)) + v_0(t) = 0, \quad (11)$$

$$\Rightarrow \vec{v}_1 + \vec{v}_2 + v_0 = 0.$$

Another boundary condition $0.5\vec{i} = 0.5(\vec{i})^* = i_0 = \frac{1}{3}i_a$ is equivalent to:

$$0.5\vec{i} = 0.5(\vec{i})^* = *i_0 \Rightarrow \vec{i}_1 + [\vec{i}_2]^* = [\vec{i}_1]^* + \vec{i}_2 = 2i_0, \quad (12)$$

$$\Rightarrow \vec{i}_1 = \vec{i}_2 = i_0.$$

The relations in (11) and (12) hold in both time domain and frequency domain. Based on (11) and (12), the interconnected network is built and shown in the circuit 300 of FIG. 3. Note for $\vec{v}_1$ and $\vec{i}_1$, the impedance is the same as those for $\vec{v}$ and $\vec{i}$. For $\vec{v}_2$ and $\vec{i}_2$, the impedance is the same as those for $(\vec{v})^*$ and $(\vec{i})^*$. The advantage of the circuit in FIG. 3 is that it can be directly related to the steady-state sequence network. The balanced source voltage only appears in the positive-sequence network.

The following remarks are based on the circuit 300 of FIG. 3. (i) The circuit 300 of FIG. 3 is a dynamic circuit with the unbalanced topology modeled. If we substitute s with $j\omega$ where $\omega$ is the synchronous frequency, the resulting circuit is the same steady-state circuit for SLG faults. (ii) For unbalanced systems that can be represented by a steady-state phasor/impedance-based sequence network, we may directly come up with the corresponding dynamic circuit by replacing $j\omega$ using the Laplace transform variable s. (iii) The dynamic circuit in FIG. 3 also reveals that unbalanced topology mitigates the effect of the equivalent rotor resistor $sR_r/s-j\omega_m$, which is negative if the excitation frequency is less than 42 Hz (corresponding to 0.7 pu rotating speed). This leads to the improvement of SSR stability.

Compared to the steady-state sequence network which is mainly used for fault analysis, the dynamic circuit is capable of stability analysis. Below is a demonstration.

We ignore the shunt magnetizing branch $sL_m$ for simplicity since its impedance magnitude is one order greater than the rotor impedances in the 20-40 Hz range. The total positive sequence impedance of the IM is:

$$Z_{IM1} = R_s + \frac{s}{s - j\omega_m} R_r + s(L_{ls} + L_{lr}). \tag{13}$$

The total negative-sequence impedance is:

$$Z_{IM2} = R_s + \frac{s}{s + j\omega_m} R_r + s(L_{ls} + L_{lr}). \tag{14}$$

For the balanced system, the loop gain is:

$$L_1(s) = \frac{Z_{IM1}(s)}{Z_{RLC}(s)} = \frac{R_s + \frac{s}{s - j\omega_m} R_r + s(L_{ls} + L_{lr})}{R + sL + \frac{1}{sC}} \tag{15}$$

For the SLG case, the loop gain is:

$$L_2(s) = \frac{Z_1(s) + Z_2(s)}{Z_{RCL}(s)} \tag{16}$$

where $Z_1(s)$ and $Z_2(s)$ are:

$$Z_1(s) = \frac{Z_{IM1} Z_{RLC}}{Z_{IM1} + Z_{RLC}}, \quad Z_2(s) = \frac{Z_{IM2} Z_{RLC}}{Z_{IM2} + Z_{RLC}}.$$

Figure 4:
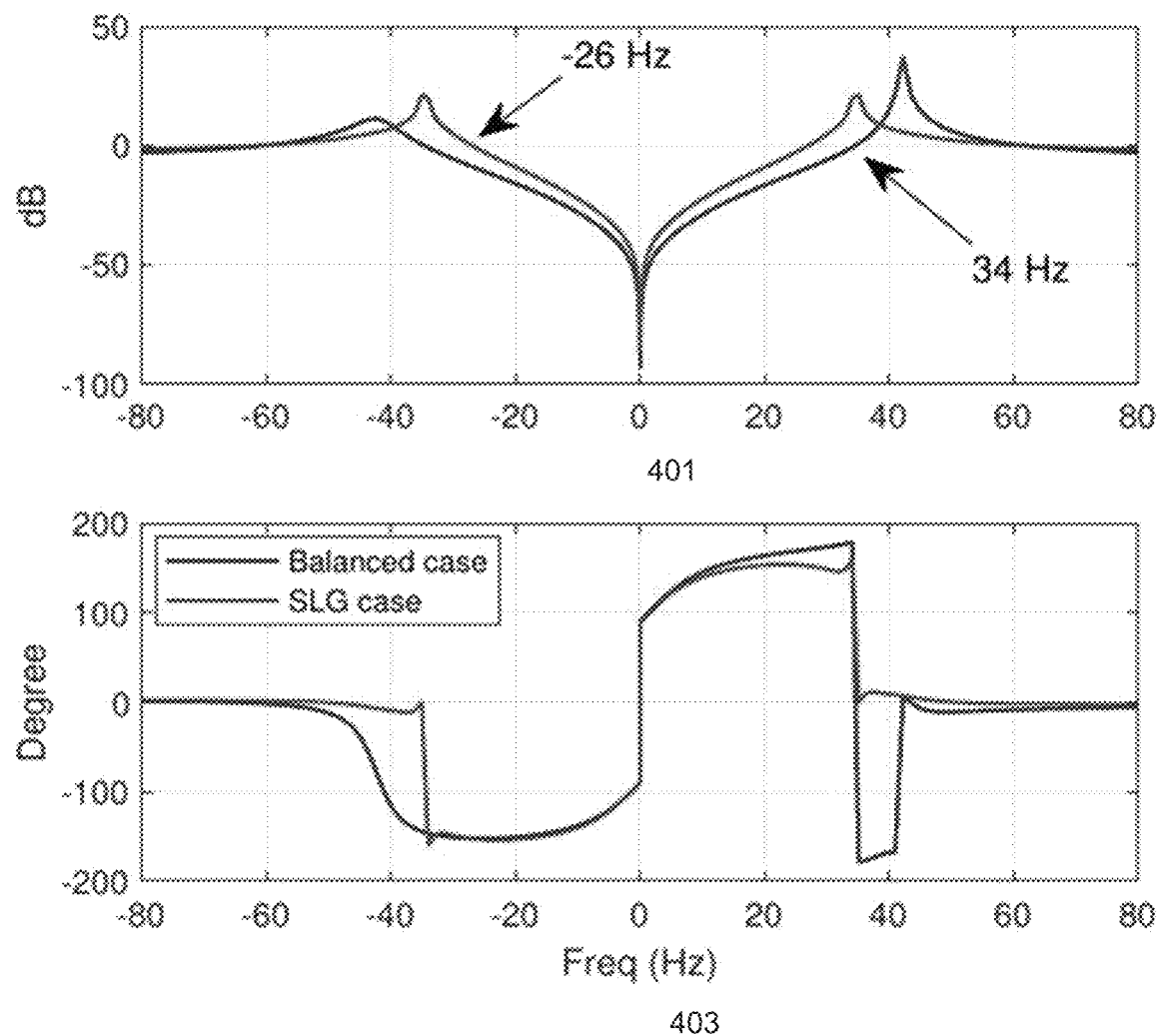
FIG. 4 is an illustration of the Bode diagram or the frequency-domain responses of loop gains for stability check.

FIG. 4 presents the Bode diagrams of the two loop gains (e.g., the graphs 401 and 403). It can be clearly seen that for the balanced system, at about 34 Hz when the phase shifts from 180° to −180°, $L_1$'s gain is at 0 dB, indicating instability. On the other hand, for the unbalanced system, the loop gain's phase keeps in the range of 0 to 180 degree in the 0-80 Hz range. At −26 Hz when $L_2$'s gain is 0 dB, the phase margin is about 30°. Hence, Bode diagram shows no stability issue for the SLG case.

Figure 5:
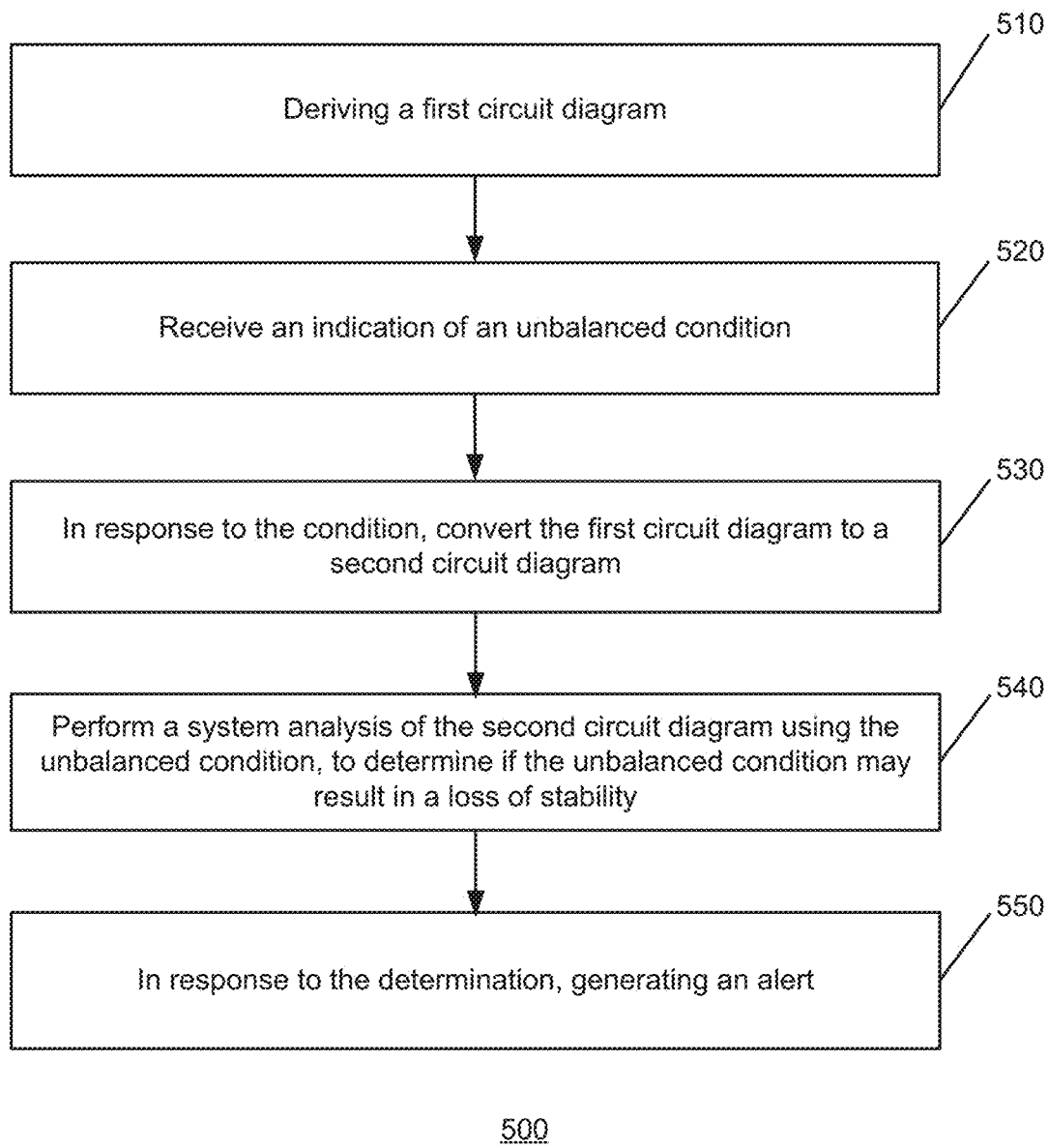
FIG. 5 is an illustration of a method for determining if an unbalanced condition may result in a loss of stability.

FIG. 5 is an illustration of an example method 500 for determining if an unbalanced condition may result in a loss of stability. The method 500 may be implemented by one or more general purpose computing devices such as the computing device 600 illustrated with respect to FIG. 6.

At 510, a first circuit diagram representing a steady state sequence network is derived. The first circuit diagram may be derived by the computing device 600. The steady state sequence network may represent a power grid. The power grid may include one or more power generators and a transmission network. Any method or technique for representing a steady state sequence network using a circuit diagram may be used.

At 520, an indication of an unbalanced condition is received. The indication may be received by the computing device 600. The unbalanced condition may be caused by a fault in the power grid, for example. The fault may be an SLG fault. Other types of faults may be supported.

In power grids, protection devices can detect unbalanced conditions quickly. For example, if the sum of three-phase current measurements is not zero, this means there exist zero-sequence currents and an unbalanced condition exists. The technology is called symmetric component theory, which converts a three-phase set into positive, negative, and zero-sequence sets. For a balanced set, there exists only the positive-sequence component. For an unbalanced set, there exist negative- and/or zero-sequence components in the sets. Thus, a negative or zero sequence component in one of the sets may indicate an unbalanced condition.

At 530, in response to the indication of the unbalanced condition, the first circuit diagram is converted to a second circuit diagram. The first circuit may be converted to the second circuit by the computing device 600. In some embodiment, the first circuit may be converted to the second circuit by representing the first circuit as a special case in the frequency domain. The representation may then be expanded to the entire frequency domain by identifying quantities associated with a nominal frequency. Next, the variable jω in the first circuit may be replaced with a Laplace transform variable s for the second circuit. An example of the second circuit is the circuit 300 illustrated with respect to FIG. 3, for example.

At 540, whether the unbalanced condition will result in a loss of stability is determined. The determination may be made by the computing device 600 by performing a system analysis of the second circuit diagram. Any method for performing a system analysis may be used. Depending on the embodiment the computing device 600 may determine that there may be a loss of stability based on frequency responses of the loop gain in the circuit diagram.

As may be appreciated, a circuit can be viewed as a feedback system and loss of stability can be judged by the frequency responses of the loop gain of the feedback system. Equations (15) and (16) are the loop gains for the feedback systems corresponding to two scenarios. Bode stability criterion may be used to judge whether stability issue exists. FIG. 4 is a Bode diagram (frequency responses) of the loop gains. This Bode diagram may be used to judge stability or loss of stability by examining gain margin and phase margin. Loss of stability may result in excessive oscillations in current and voltages and lead to tripping of transmission lines or other devices associated with the power grid. This loss of stability may further lead to disruption of power supply or blackout, for example.

At 550, in response to determining that the unbalanced condition may result in a loss of stability, an alert is generated. The alert may be generated by the computing device 600 and sent to the entity or entities that provided the indication of the unbalanced condition. Any method for generating an alert may be used.

Figure 6:
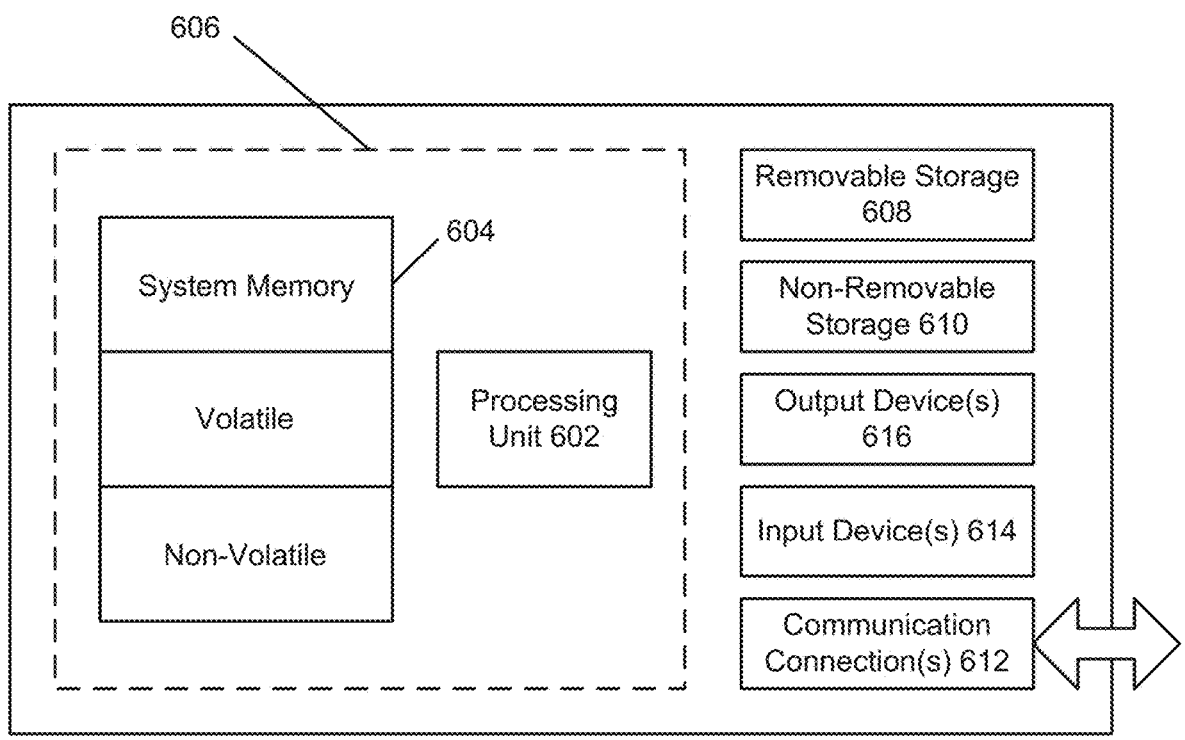
FIG. 6 shows an example computing environment in which example embodiments and aspects may be implemented.

With reference to FIG. 6, an example system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although example implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
deriving a first circuit diagram representing a steady state sequence network by a computing device;
receiving an indication of an unbalanced condition in the steady state sequence network by the computing device;
in response to the indication of the unbalanced condition, converting the first circuit diagram to a second circuit diagram comprising impedances in the Laplace domain by the computing device;
performing a system analysis of the second circuit diagram using the unbalanced condition to determine if the unbalanced condition may result in a loss of stability for a power grid by the computing device; and
in response to determining that the unbalanced condition may result in a loss of stability, generating an alert that the unbalanced condition may result in the loss of stability by the computing device.

2. The method of claim 1, wherein the unbalanced condition is caused by a fault in the power grid.

3. The method of claim 2, wherein the fault is a balanced or unbalanced fault.

4. The method of claim 1, wherein the steady state sequence network represents the power grid.

5. The method of claim 4, wherein the power grid comprises generators and a transmission network.

6. The method of claim 1, wherein the unbalanced condition is associated with an unbalanced fault in an otherwise balanced and symmetrical three-phase transmission system.

7. The method of claim 1, wherein converting the first circuit diagram to the second circuit diagram comprises representing the steady-state circuit diagram as a special case in a frequency domain, and expanding the representation to an entire frequency domain by identifying quantities associated with a nominal frequency and replacing a variable $j\omega$ with a Laplace transform variable s, where w is the nominal frequency or a synchronous frequency of the first circuit diagram.

8. A system comprising:
one or more processors; and
a computer-readable medium with computer-executable instructions that when executed by the one or more processors cause the one or more processors to:
derive a first circuit diagram representing a steady state sequence network;
receive an indication of an unbalanced condition in the steady state sequence network;
in response to the indication of the unbalanced condition, convert the first circuit diagram to a second circuit diagram comprising impedances in the Laplace domain;
perform a system analysis of the of the second circuit diagram using the unbalanced condition to determine if the unbalanced condition may result in a loss of stability for a power grid; and
in response to determining that the unbalanced condition may result in a loss of stability, generate an alert that the unbalanced condition may result in the loss of stability.

9. The system of claim 8, wherein the unbalanced condition is caused by a fault in the power grid.

10. The system of claim 9, wherein the fault is a balanced or unbalanced fault.

11. The system of claim 8, wherein the steady state sequence network represents the power grid.

12. The system of claim 11, wherein the power grid comprises generators and a transmission network.

13. The system of claim 8, wherein the unbalanced condition is associated with an unbalanced fault in an otherwise balanced and symmetrical three-phase transmission system.

14. The system of claim 8, wherein converting the first circuit diagram to the second circuit diagram comprises representing the steady-state circuit diagram as a special case in a frequency domain, and expanding the representation to an entire frequency domain by identifying quantities associated with a nominal frequency and replacing a variable $j\omega$ with a Laplace transform variable s, where w is the nominal frequency or a synchronous frequency of the first circuit diagram.

15. A non-transitory computer-readable medium with computer-executable instructions that when executed by one or more processors cause the one or more processors to:
  derive a first circuit diagram representing a steady state sequence network;
  receive an indication of an unbalanced condition in the steady state sequence network;
  in response to the indication of the unbalanced condition, convert the first circuit diagram to a second circuit diagram comprising impedances in the Laplace domain;
  perform a system analysis of the second circuit diagram using the unbalanced condition to determine if the unbalanced condition may result in a loss of stability for a power grid; and
  in response to determining that the unbalanced condition may result in a loss of stability, generate an alert that the unbalanced condition may result in the loss of stability.

16. The non-transitory computer-readable medium of claim 15, wherein the unbalanced condition is caused by a fault in the power grid.

17. The non-transitory computer-readable medium of claim 16, wherein the fault is a balanced or unbalanced fault.

18. The non-transitory computer-readable medium of claim 15, wherein the steady state sequence network represents the power grid.

19. The non-transitory computer-readable medium of claim 18, wherein the power grid comprises generators and a transmission network.

20. The non-transitory computer-readable medium of claim 15, wherein the unbalanced condition is associated with an unbalanced fault in an otherwise balanced and symmetrical three-phase transmission system.

* * * * *